May 10, 1927.  
W. H. POWELL  
1,628,613  
DYNAMO ELECTRIC MACHINE AND WINDING THEREFOR.  
Original Filed May 16, 1924
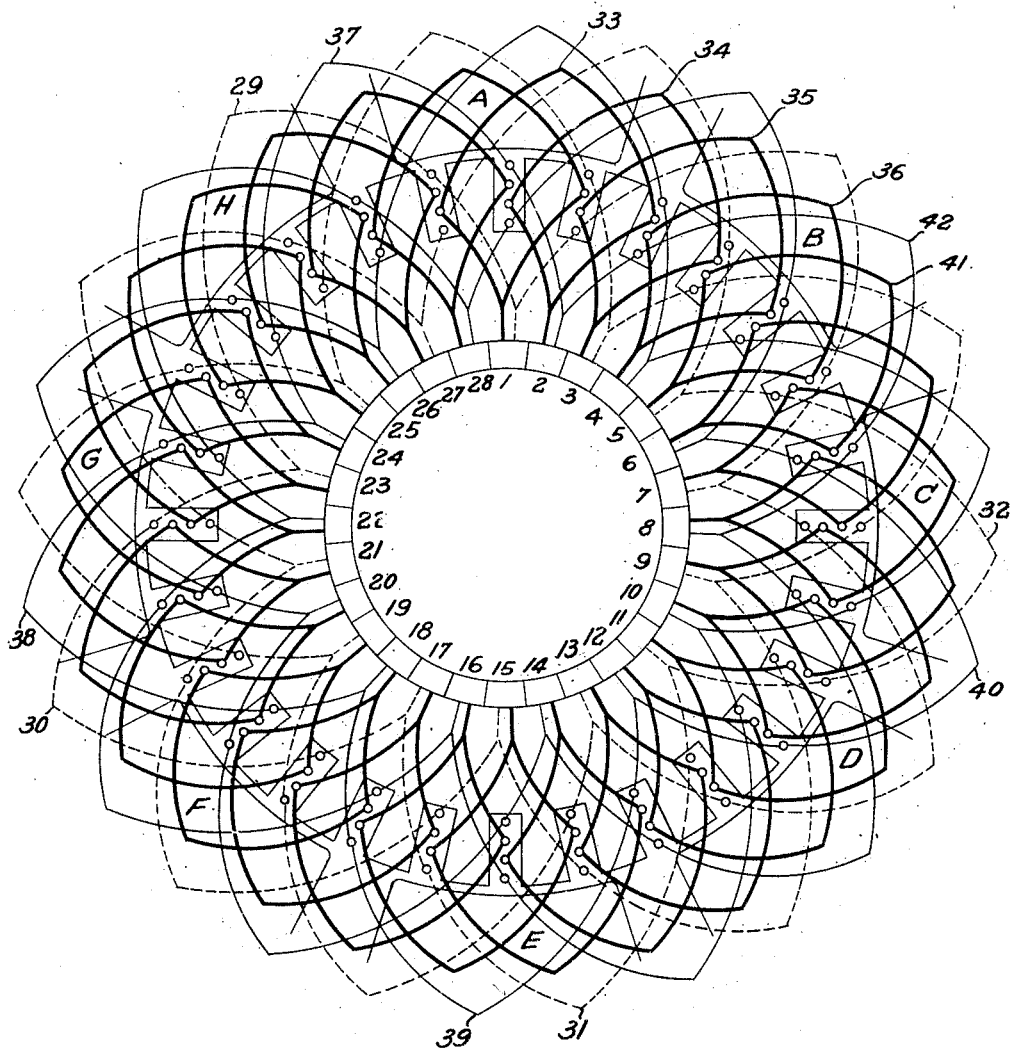
Inventor  
W. H. Powell  
by  
Attorney Patented May 10, 1927.

1,628,613

UNITED STATES PATENT OFFICE.

WILLIAM H. POWELL, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE AND WINDING THEREFOR.

Original application filed May 16, 1924, Serial No. 713,723. Divided and this application filed July 29, 1926. Serial No. 125,665.

This invention relates to dynamo electric machines and windings therefor and this application is a division of applicant's copending application Serial No. 713,723 filed May 16, 1924.

The general objects of the present invention are the same as in the above identified copending application. More specifically it is an object to provide a multiplex wave winding equalized without the use of external cross connectors.

The novel features of the invention will appear from this specification and the accompanying drawing forming a part thereof and disclosing one embodiment of invention, and all these novel features are intended to be pointed out in the claims.

The single figure of the drawing illustrates in diagrammatic form a dynamo electric machine embodying one form of the invention.

Referring to the drawing the machine here illustrated is provided with eight poles A, B, C, D, E, F, G and H, and the commutator has twenty-eight bars. For the sake of simplicity of illustration the armature is shown as provided with the same number of slots as there are commutator bars. Disposed in the slots is a multiplex wave winding, the active conductors of which are here shown as occupying the radially outermost and innermost positions in the slots. The wave winding comprises two independent windings one of which is indicated by the dotted lines and the other by the light full lines. The multiplex wave winding comprises a total of twenty-eight coils so that there is one coil per slot. There are thus 14 coils in each of the components of the multiplex wave winding. The commutator pitch of the wave coils is one bar less than the number of bars per pair of poles, and in the instance shown is equal to six. The slot pitch of the wave coils is here shown as four. The multiplex wave winding has a total of 8 circuits or paths, each component being doubly reentrant. Regarding the number of circuits in a wave winding it is to be noted that a simplex wave winding always has two circuits no matter what the number of pairs of poles may be. We may term this the normal number of wave circuits. The terms multiplex or multiply reentrant may be used to characterize the type of winding and the number of its circuits, if the winding has more than two circuits. For example, a duplex wave winding is one in which, as in the illustrated example, there are two independent windings. If each of these windings were singly reentrant the duplex winding would have four circuits. A doubly reentrant wave winding also has four circuits just as a duplex wave winding but in the doubly reentrant winding all of the conductors must be traced through before the starting point is reached. It will thus be seen that the terms duplex and doubly reentrant are used to indicate that the winding so designated has twice as many circuits as a simplex wave winding and further that these terms indicate that in one case two independent windings are present while in the other there is but one winding. The same of course applies to multiplex and multiply reentrant windings in general. Referring again more specifically to the illustrated winding, this is of the duplex type. The number of circuits in the winding as a whole may be determined in a number of different ways. One way is to begin at a given commutator bar and trace through as many coils as there are pairs of poles; then the number of bars by which this group of coils fails to reach the bar started from gives the factor by which the normal number of wave circuits, namely 2, must be multiplied to give the total circuits. For example, starting at bar 2 and tracing through coil 42 and so on through a total of four coils, bar 26 is reached. This bar fails to reach bar 2 by four bars. The total number of circuits is therefore eight. Inasmuch as there are two independent windings, each of these has four circuits, that is, double the normal number, and hence each of these components is termed doubly reentrant.

The illustrated example characterizes an entire class of windings because any wave winding has as many component independent windings as the highest common divisor of the commutator pitch of the coils and the number of commutator bars. For example, the commutator pitch, 6, and the number of bars, 28, have two as the highest common divisor. The winding is therefore duplex.

It is therefore obvious that if the number of commutator bars and coil pitch are selected in accordance with the hereinbefore stated rule the winding will be of the multiplex type. A multiplex wave winding is impracticable unless means are provided for properly equalizing the circuits and for securing a proper division of electromotive forces at the commutator. Equalization is accomplished in the following manner.

Considering wave coil 29, for example, which is connected to bars 1 and 23 it will be noted that a lap coil 33 is provided having one of its sides here shown as in the same slot as one of the sides of wave coil 29 the pitch of lap coil 33 is three slots and the terminals of the coil are connected to bars 1 and 2. Lap coil 33 is thus of the so-called progressive type. If the commutator pitch of the wave coils were equal to the number of bars per pair of poles plus one, the lap coil would be made of retrogressive form. In spite of the fact that there are seven slots per pair of poles yet it is evident that wave coil 29 and lap coil 33 are disposed so as to generate the same E. M. F. Moreover bars 2 and 23 are equipotential bars and there is thus a possible path furnished between these bars by way of lap coil 33 and wave coil 29 which generate equal and opposite E. M. F.'s. Furthermore while bar 1 has connected thereto coils belonging to the dotted line wave winding, bar 2 has connected thereto coils belonging to the light full line wave winding. For example, wave coil 42 generates the same E. M. F. as coil 29. It will be obvious that if twenty-eight lap coils similar to coil 33 are disposed on the armature a lap winding will be produced having the same number of circuits as the multiplex wave winding. All of the equipotential commutator bars will then be interconnected as hereinbefore set forth in connection with bars 2 and 23. The twenty-eight lap coils form in the illustrated example a simplex lap winding indicated by the heavy full lines. It is to be noted that the lap coils as well as the wave coils are load-current-carrying coils.

From another point of view equalization is also secured in the following manner. For example, beginning at bar 1 we may trace through wave coils 29, 30, 31 and 32 to bar 5. Beginning again at bar 1 we may trace through the lap coils 33, 34, 35 and 36 to bar 5. It will be evident by inspection that the four lap coils are disposed to generate an E. M. F. equal and opposite to that generated by the hereinbefore mentioned group of four wave coils. Moreover whereas the four lap coils are influenced by but one pair of poles the group of wave coils is influenced by all of the poles. In like manner the group of wave coils 37, 38, 39 and 40 is balanced by the group of lap coils 34, 35, 36 and 41 connected respectively to bars 2 and 6. It will be evident that all of the wave coils are in like manner balanced, group by group, against groups of lap coils generating the same E. M. F. respectively.

It will be understood that the slot pitch of the wave and lap coils may be other than illustrated as long as the electromotive forces generated by coils forming a path between equipotential commutator bars are equal and opposite. Moreover it should be understood that the number of poles, commutator bars, slots, and coils may be varied and that the example herein described is merely illustrative.

It should be understood that it is not desired to limited the invention to the exact details of construction herein shown and described, for various modifications within the scope of the claims may occur to persons skilled in the art.

It is claimed and desired to secure by Letters Patent:

1. A winding for dynamo electric machines including a plurality of independent wave windings, and a simplex lap winding interconnecting said wave windings.

2. An armature winding for dynamo electric machines including a plurality of independent wave windings, and a simplex lap winding interconnecting said wave windings, all connected to the same commutator.

3. An armature winding for dynamo electric machines including a plurality of independent wave windings, and a simplex lap winding interconnecting said wave windings and having the same number of paths as the said plurality of wave windings, all of said windings being connected to the same commutator.

4. A winding for dynamo electric machines including a plurality of wave windings, and equalizing connections between said windings including load-current-carrying conductors.

5. A winding for dynamo electric machines including a plurality of independent wave windings, and a predetermined number of equalizing connections between said windings including a predetermined number of lap wound coils.

6. A multiplex wave winding for dynamo electric machines, comprising a plurality of imbricated independent wave windings the active conductors of one winding being disposed so that they are adapted to pass a given polar position while active conductors of another winding are passing a similar polar position and a predetermined number of equalizing connections between conductors of one winding and conductors of another winding including a predetermined number of active winding elements.

7. In combination, a multiplex wave winding, having $m$ windings, for commutator type dynamo electric machines, and means for preventing the potential difference between adjacent commutator bars from rising substantially above one $m$-th of the normal potential difference between every $m$-th bar during operation of the machine including active winding elements.

8. In combination, a multiplex wave winding having $m$ windings, for commutator type dynamo electric machines, and means for preventing the potential difference between adjacent commutator bars from rising substantially above one $m$-th of the normal potential difference between every $m$-th bar during operation of the machine comprising a lap winding connected to the same commutator.

In testimony whereof, the signature of the inventor is affixed hereto.

WILLIAM H. POWELL.